(12) United States Patent
Cozens

(10) Patent No.: US 9,072,956 B2
(45) Date of Patent: Jul. 7, 2015

(54) WAKEBOARDING POOL AND METHOD OF USE THEREOF

(76) Inventor: Mark Randall Cozens, Scottsdale, AZ (US)

(*) Notice: Subject to any disclaimer, the term of this patent is extended or adjusted under 35 U.S.C. 154(b) by 674 days.

(21) Appl. No.: 13/364,178

(22) Filed: Feb. 1, 2012

(65) Prior Publication Data

US 2012/0192345 A1 Aug. 2, 2012

Related U.S. Application Data

(60) Provisional application No. 61/438,508, filed on Feb. 1, 2011.

(51) Int. Cl.
*A47K 3/10* (2006.01)
*A63B 69/18* (2006.01)
*G09B 9/06* (2006.01)
*A63B 69/00* (2006.01)

(52) U.S. Cl.
CPC ........... *A63B 69/187* (2013.01); *A63B 69/0093* (2013.01); *G09B 9/066* (2013.01); *A63B 2208/03* (2013.01); *A63B 2225/60* (2013.01)

(58) Field of Classification Search
CPC ........................ A63B 69/0093; A63B 69/187
USPC .................................. 4/491; 472/128; 405/79
See application file for complete search history.

(56) References Cited

U.S. PATENT DOCUMENTS 2,815,951 A * 12/1957 Baldanza ...................... 434/253
7,625,153 B2 * 12/2009 Sauerbier ......................... 405/79
2009/0133187 A1 * 5/2009 Kim et al. ......................... 4/507

\* cited by examiner

*Primary Examiner* — Janie Christiansen
(74) *Attorney, Agent, or Firm* — Schmeiser, Olsen & Watts LLP

(57) ABSTRACT

A wakeboarding system and pool are provided. The wakeboarding system includes a deck, a pool of water adjacent the deck, a pad having a top surface and a bottom surface, the pad being fixedly coupled to the deck and protruding therefrom over a portion of the pool of water, the bottom surface of the pad being in contact with the pool of water and the pad being configured to float, and a flow of water over the top surface of the pad. The pad has an outer edge that opposes the deck, the outer edge being configured in a semi-circle. The pad further includes protrusions on the pad, the protrusions being configured on the top surface of the pad to allow a wake boarder to engage the protrusions. The apparatus further includes a towing mechanism and a tow device coupled thereto for towing the wake boarder.

9 Claims, 6 Drawing Sheets

WAKEBOARDING POOL AND METHOD OF USE THEREOF

CROSS REFERENCE TO RELATED APPLICATION[S]

This application claims priority to U.S. Provisional Patent Application to Cozens entitled "WAVE POOL," Ser. No. 61/438,508, filed Feb. 1, 2011, the disclosure of which is hereby incorporated entirely herein by reference.

BACKGROUND

1. Technical Field

This disclosure relates generally to the activity of wakeboarding and in particular to a wakeboarding pool.

2. State of the Art

The activity of wakeboarding involves riding a wakeboard over the surface of a body of water. A rider of a wakeboard, or a wake boarder, is usually towed with a rope behind a motorboat. The wake boarder holds onto the rope attached to the boat and the boat provides the speed, movement, and force required to cause the wake boarder to rise up out of the water and wakeboard across the surface of the water. Once on the surface of the water, the wake boarder can maneuver behind the boat and perform turns, tricks and other skills. Using edging techniques, the rider can move outside of the wake or cut rapidly in toward the wake, as desired. Jumps can be performed by hitting the wake and launching into the air.

However, the activity of wakeboarding can be negatively influenced by several irrepressible factors, such as the location of a body of water suitable for the activity of wakeboarding, accessibility to a boat suitable for towing a wake boarder, the weather, the water conditions, and the size and experience of the wake boarder. At times, these factors can prohibit wakeboarding altogether.

Thus, there is a need in the wakeboarding industry for a system and apparatus that addresses the above-described concerns and makes the activity of wakeboarding more convenient and accessible to the masses.

SUMMARY

This disclosure relates generally to the activity of wakeboarding and in particular to a wakeboarding pool.

An aspect of the present disclosure includes an apparatus for wakeboarding, the apparatus comprising a deck, a pool of water adjacent the deck, a pad having a top surface and a bottom surface, the pad being fixedly coupled to the deck and protruding therefrom over a portion of the pool of water, the bottom surface of the pad being in contact with the pool of water and the pad being configured to float on the pool of water, and a flow of water over the top surface of the pad, wherein the flow of water enters the pool of water after flowing over the pad.

Another aspect of the present disclosure includes the pad further comprising an outer edge that opposes the deck, the outer edge being configured in a semi-circle.

Another aspect of the present disclosure includes the pad further comprising a protrusion having a length, the protrusion configured on the top surface of the pad and the length of the pad being oriented parallel to the radius of the pad.

Another aspect of the present disclosure includes the apparatus further comprising a towing mechanism, the towing mechanism having a tow device coupled thereto for towing a wake boarder, the towing mechanism being configured at a virtual center of the semi-circular pad.

Another aspect of the present disclosure includes the apparatus further comprising a water reservoir, a water pump, piping, and a water propellant unit, the water pump being configured to pump water from the water reservoir through the piping to the water propellant unit, the water propellant unit being configured to direct the flow of water over the top surface of the pad.

Another aspect of the present disclosure includes the apparatus further comprising a plurality of water propellant units and two wedge-like protrusions on the pad, the water propellant units positioned between the two wedge-like protrusions being configured to direct the flow of water parallel with the radius of the pad, and the water propellant units positioned outside the two protrusions being configured to direct the flow of water perpendicular to the deck, Another aspect of the present disclosure includes the water pump being configured to adjust the flow of water out of the water propellant unit under the condition that certain predetermined conditions are satisfied.

Another aspect of the present disclosure includes a wakeboarding system, the system comprising a deck, a pool of water adjacent the deck, a pad having a top surface and a bottom surface, the pad being fixedly coupled to the deck and protruding therefrom over a portion of the pool of water, a flow of water over the top surface of the pad, wherein the pad separates the flow of water from the pool of water and the flow of water engages the pool of water after flowing over the pad, and a protrusion on the pad, the protrusion having an outer surface and being configured to receive the flow of water over the outer surface to simulate a motorboat wake.

Another aspect of the present disclosure includes, under the condition that the wake boarder engages the tow device, the towing mechanism and tow device cooperating to permit the wake boarder to traverse the semi-circle pad about a perimeter of the pad from one end of the semi-circle shape to an opposing end of the semi-circle shape.

Another aspect of the present disclosure includes the pad further comprising a plurality of protrusions oriented parallel with the radius of the pad, the plurality of protrusions being configured on the pad to simulate opposing sides of the motorboat wake.

Another aspect of the present disclosure includes the apparatus further comprising a plurality of water propellant units, the water propellant units positioned between the protrusions creating the opposing sides of the motorboat wake being configured to direct the flow of water parallel with the radius of the pad, and the water propellant units positioned outside the protrusions creating the opposing sides of the motorboat wake being configured to direct the flow of water perpendicular to the deck.

An aspect of the present disclosure includes a method of wakeboarding, the method comprising providing a pool of water adjacent a deck, providing a towing mechanism, including a towing device for engaging a wake boarder, providing a pad coupled to the deck and protruding therefrom over a portion of the pool of water, flowing a sheet of water over the pad, and wakeboarding over the pad on the sheet of water flowing thereon.

Another aspect of the present disclosure includes the pad comprising a protrusion thereon, and the flowing a sheet of water over the pad further comprises flowing the sheet of water onto the protrusion.

Another aspect of the present disclosure includes the method further comprising crisscrossing the protrusion and engaging the protrusion to propel the wake boarder into the air above the pad.

Another aspect of the present disclosure includes the method further comprising deflecting the pad in response to forces acting thereon.

Another aspect of the present disclosure includes the towing mechanism being configured at a virtual center of the semi-circular pad.

The foregoing and other features, advantages, and construction of the present disclosure will be more readily apparent and fully appreciated from the following more detailed description of the particular embodiments, taken in conjunction with the accompanying drawings.

BRIEF DESCRIPTION OF THE DRAWINGS

Some of the embodiments will be described in detail, with reference to the following figures, wherein like designations denote like members.

DETAILED DESCRIPTION OF EMBODIMENTS

A detailed description of the hereinafter described embodiments of the disclosed apparatus and method are presented herein by way of exemplification and not limitation with reference to the Figures listed above. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Figure 1:
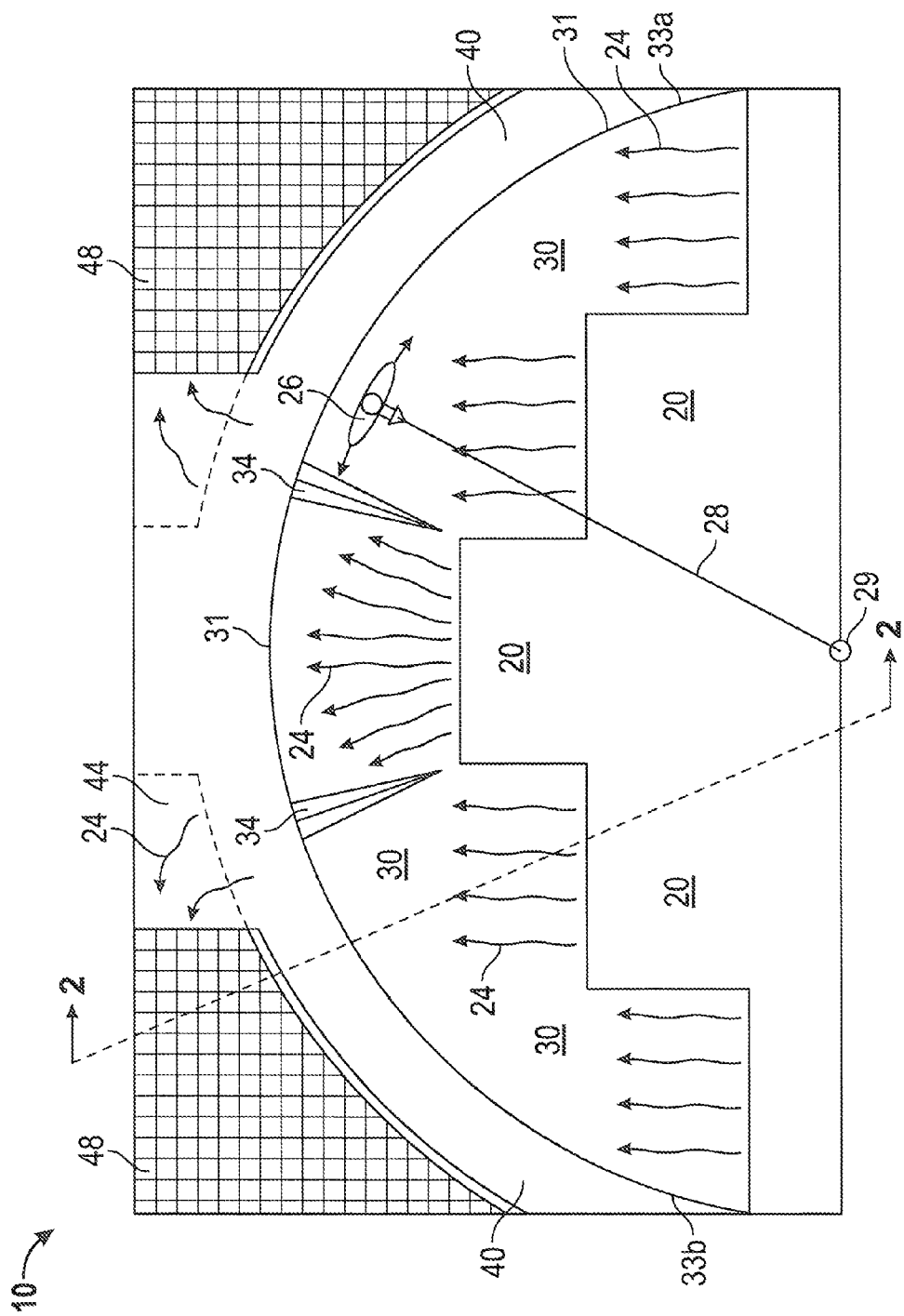
FIG. 1 depicts a top view of a wakeboarding system in accordance with the present disclosure.
Figure 2:
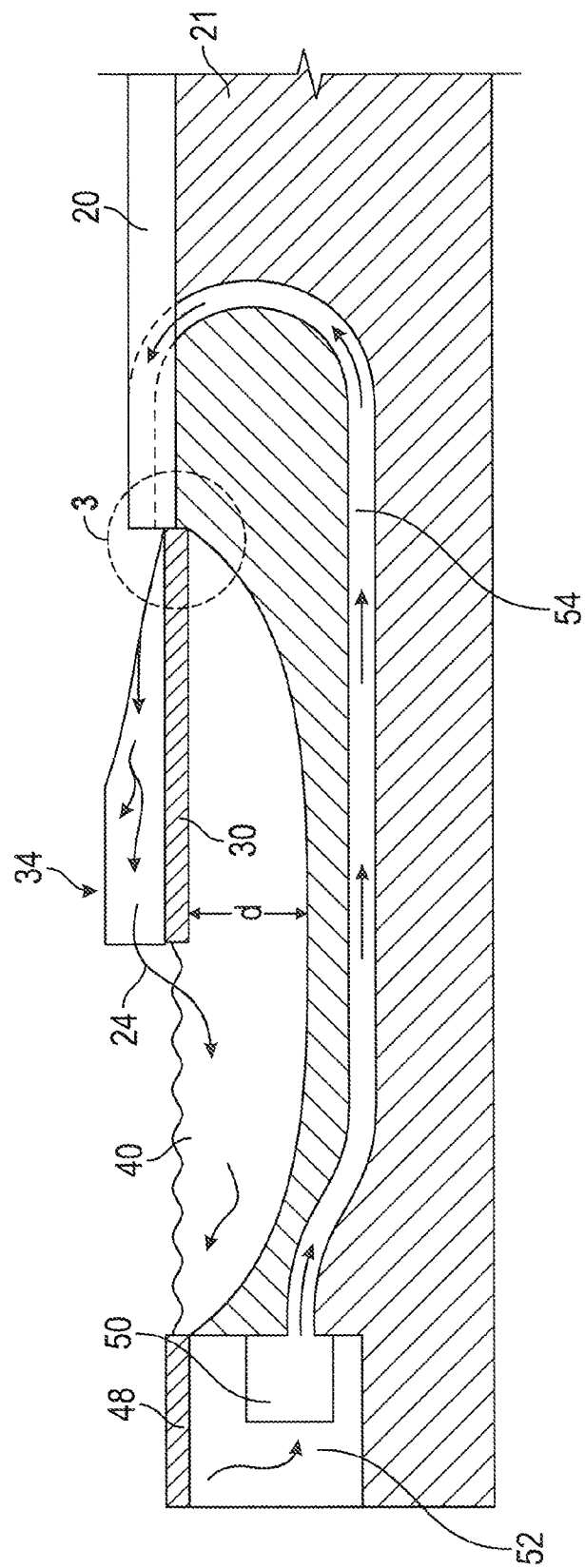
FIG. 2 depicts a cross-section view of the wakeboarding system taken along line 2-2 of FIG. 1 in accordance with the present disclosure.

Referring to the drawings, FIGS. 1 and 2 depict an exemplary embodiment of a wakeboarding system 10. The wakeboarding system 10 comprises a deck 20, a pad 30, a pool 40, and a flow of water 24. The deck 20 of the system 10 can be made of concrete or shotcrete and can be coated with a water-resistant coating. Further, the deck 20 may be made to be waterproof and may have a textured upper surface for resistance to slipping when the surface is wet. The deck 20 may have a staggered configuration, as shown in FIG. 1, to reduce the material needed for the pad 30, which will be described hereinafter.

Embodiments of the system 10 include the pad 30 being comprised of foam materials, such as, for example, closed-cell foam material that may have a vinyl coating thereon. The pad 30 may further be comprised of rubber materials, such as expanded rubber or EVA. The pad 30 may have a thickness T that permits the pad 30 to exhibit buoyant properties in water. The pad 30 may be 2" to 3" thick to exhibit the requisite buoyancy. Embodiments of the system 10 include the pad 30 being fixedly coupled to the deck 20. Embodiments of the system 10 include the pad 30 being releasably coupled to the deck 20. Embodiments of the system 10 include the pad 30 being comprised of individual sections that may be releasably and repeatedly coupled together to form the entire pad 30. The pad 30, or its individual sections, as the case may be, are configured to be coupled to an edge surface of the deck 20, at a portion of the deck 20 that is lower than the top surface of the deck 20, such that the top surface of the pad 30 is lower than the top surface of the deck 20. Other embodiments of the system include the pad 30, or individual sections thereof, being positioned in relation to the deck 20 such that the top surface of the pad 30 is co-planar with the top surface of the deck 20. The pad 30 may be further configured to extend outward from the deck 20 over the pool of water 40 that is adjacent to the deck 20. The pad 30 may be configured in a semi-circular shape, such that a perimeter, or outer edge 31, of the pad 30 forms a half circle shape.

The pad 30 may be further configured to comprise a protrusion 34 in the top surface of the pad 30. The protrusion 34 may be integrally formed with the pad 30 or, alternatively, may be configured to be releasably and repeatedly coupled to the pad 30 at various predetermined locations on the pad 30 to provide flexibility in the configuration of the pad 30 and the position of the protrusion 34 thereon. The protrusion 34 may be generally wedge-shaped. For example, but not by way of limitation, the protrusion 34 may have a cross-sectional shape that generally resembles a triangle, with the base of the protrusion 34 adjacent the pad 30 and the tip of the protrusion 34 rising up off the pad 30. Also, the protrusion 34 may be configured to have an axial length and the protrusion 34 may be configured on the pad 30 such that the axial length of the protrusion 34 is oriented parallel to the radius of the semi-circular pad 30.

Embodiments of the system 10 further include the pad 30 having a plurality of protrusions 34 positioned thereon. Each of the protrusions 34 may be integrally formed with the pad 30 or, alternatively, may be configured to be releasably and repeatedly coupled to the pad 30 at various predetermined locations on the pad 30 to provide flexibility in the configuration of the pad 30 and the position of the protrusions 34 thereon. In one exemplary embodiment of the system 10, two opposing protrusions 34 may be placed on the pad 30 at a position on the pad 30 to simulate two opposing sides of a motorboat wake. The protrusions 34 that are configured to be removable from the pad 30 may have heights that vary from protrusion 34 to protrusion 34 to simulate large or small motorboat wakes, as the case may be or as the wake boarder 26 may desire.

Embodiments of the system 10 include the pool of water 40 being configured adjacent the deck 20. The pool of water 40 can be configured in a similar shape to the pad 30, but slightly larger than the pad 30 so as to extend beyond the outer edge 31 of the pad 30. The pool of water 40 resides underneath the pad 30 to provide the buoyant properties described above. The pool of water 40 further resides beyond the outer edge 31 of the pad 30 so as to provide an area in which the wake boarder 26 may dismount from the pad 30, whether voluntarily or involuntarily, and fall into the pool of water 40. In other words, the pool of water 40 provides a soft impact zone for receiving a wake boarder 26 that falls while wakeboarding or willingly chooses to quit and dismount. In that regard, the pool of water 40 is also generally configured with a depth d at or near where a wake boarder 26 might utilize the system 10. The depth d is configured to provide a safe depth of water to allow a wake boarder 26 utilizing the system 10 to fall into the body of water 40 and not contact the bottom surface of the pool of water 40. Embodiments of the system 10 include the depth d being between 6 and 10 feet. An exemplary embodiment includes the depth d being at or near 8 feet.

The pool of water 40 may further comprise a bench section 44 that is configured as a gradual rise out of the pool of water 40. The bench section 44 may be positioned near an exit point of the pool of water 40 to assist the wake boarder 26 in exiting the water. Also, the bench section 44 may be positioned near a grate 48, the grate 48 being configured to cover a water reservoir 52, to be described in greater detail below. After the flow of water 24 flows over the pad 30 and off of the pad 30 into the pool of water 40, the flow of water 24 continues to flow up the bench 44 and over the grate 48 and down in to the water reservoir 52. Once in the water reservoir 52, a pump 50 pumps the water in the water reservoir 52 through piping 54 back to the water propellant units 26 and onto the pad 30. Thus the water in the system 10 flows in a cyclical manner through the various components that comprise the system 10. The water in the system 10 may be chemically treated to conform to typical municipal health code requirements and ANSI standards. The water within the system 10 may be filtered by filters and sanitized by chemicals, or other sanitation means, and skimmed with corresponding skimmers. The water within the system 10 may be heated by a heater and may have attached thereto a temperature control that is adjustable by the operator of the system 10. The system 10 may further comprise a water level detection system that automatically detects water levels in the pool of water 40 and automatically adjusts the level of the water in the pool of water 40 should the level of the water fall below a predetermined level. Likewise, should the water level in the pool of water 40 rise above a predetermined level, a drain within the system may operate to remove water from the system 10 to lower the water level in the pool of water 40 to within acceptable predetermined levels.

Figure 3:
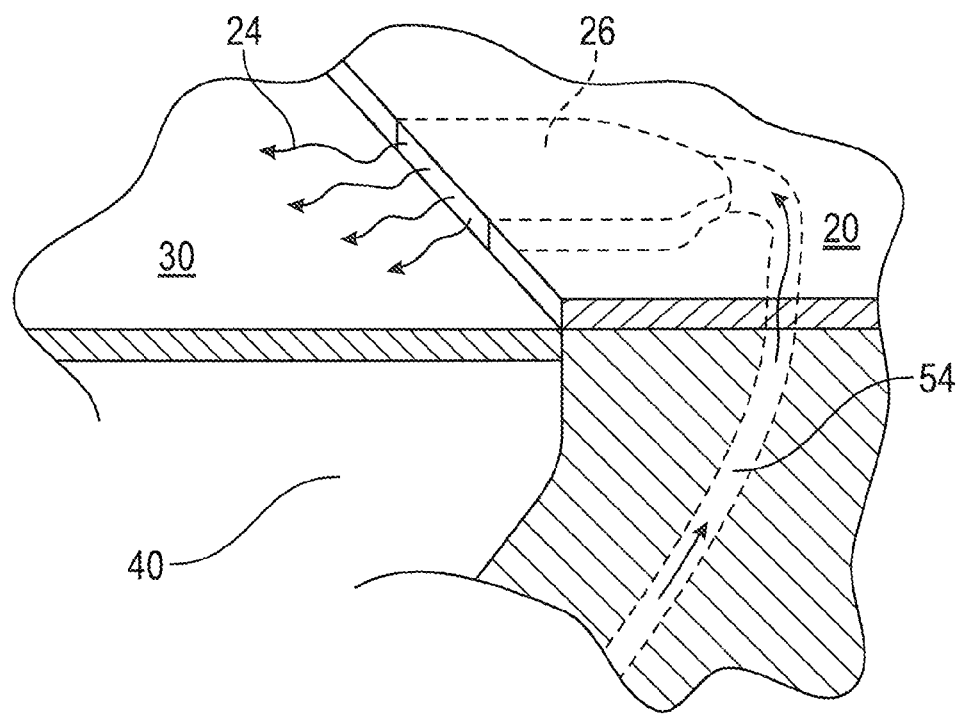
FIG. 3 depicts an enlarged cut-away perspective view of a section of the wakeboarding system depicted in the circle of FIG. 2 in accordance with the present disclosure.

With reference to FIGS. 1-3, embodiments of the system 10 include a flow of water 24 being directed over the top surface of the pad 30. The flow of water 24 may be directed over the pad 30 by a water propellant unit 26. The water propellant unit 26 is positioned in the deck 20 or on the deck 20 to function to distribute a sheet of water flow 24 over the pad 30. The system 10 may comprise a plurality of water propellant units 26 that together function to direct a sheet of water flow 24 over the entire pad 30. Each of the water propellant units 26 may be individually coupled to piping 54 that is coupled to a water pump 50 that intakes water from a water reservoir 52 and pushes water through the piping 54 and into each of the water propellant units 26. Each of the water propellant units 26 is configured to receive the water from the piping 54 and direct the water through the water propellant unit 54 and onto the pad 30. The pump 50 provides the necessary pressure to expel the water out of each of the water propellant units 26 and over the entire pad 30. The system 10 may further comprise a plurality of pumps 50 and a network of piping 54 to provide the requisite water pressure. As depicted, the piping 54 is configured in the ground 21 on which the system 10 rests. However, the piping 54 may be configured to rest above the ground 21 so as to be accessible for repairs.

Embodiments of the system 10 include the water propellant units 26 being configured to maintain a continuous flow of water 24 over the entire surface of the pad 30 as well as over the protrusions 34 on the pad 30. Each of the water propellant units 26 is configured to be individually adjusted to alter the flow of water 24 exiting therefrom. For example, each of the water propellant units 26 may be adjusted to restrict or increase the flow of water 24 emanating therefrom or may be adjusted to alter the direction of the flow of water 24 emanating therefrom. Internal pivoting fins within the water propellant units 26 may be adjusted to alter the flow of water 24 exiting therefrom.

In an exemplary embodiment of the system, the pad 30 may comprise the two opposing protrusions 34 that are positioned on the pad 30 to simulate opposing sides of a motorboat wake, as mentioned above. Each of the protrusions 34 has sides 36, an inner side and an outer side. These protrusions 34 are oriented on the pad 30, such that the length of the respective protrusions 34 is parallel with the radius of the pad 30. This configuration of the protrusions 34 simulates the real-world configuration of opposing sides of a wake of a motor boat that are angled, usually in a v-shape, with respect to one another. Moreover, the water propellant units 26 positioned between these opposing protrusions 34 may be oriented to direct the flow of water 24 emanating therefrom in a line parallel with the radius of the pad 30, as depicted in FIG. 1, to simulate the v-shaped pattern of a motor boat wake. Also, the water propellant units 26 positioned outside these opposing protrusions 34 may be oriented to direct the flow of water 24 emanating therefrom in a line perpendicular to the edge of the deck 20, as depicted in FIG. 1, to simulate the standing water in a body of water outside the v-shaped pattern of a motor boat wake. In this particular configuration, the flow of water 24 inside the opposing protrusions 34 is configured to flow up, onto, and perhaps even over the inner side 36 of each of the opposing protrusions 34 and the flow of water 24 outside the opposing protrusions 34 is configured to flow up, onto, and perhaps even over the outer side 36 of each of the protrusions 34 to thereby simulate the shape and flow of a wake that results from a motorboat traveling in a standing body of water. Under these conditions, the system 10 is able to produce a flow of water 24 that behaves like a moving sheet of water over the pad 30. The flow of water 24 in exemplary embodiments of the system 10 may be 2" to 4" thick. One exemplary embodiment comprises a flow of water 24 that is nearly 3" thick. Moreover, the velocity of the flow of water 24 in exemplary embodiments of the system 10 may be between 12 to 25 miles per hour to simulate the speed of a wake boarder 26 being towed behind a motorboat. The speed of the flow of water 24 may be adjusted by the system 10, and in particular the pump 50, to accommodate for such factors as the weight of the wake boarder 26 and the skill level of the wake boarder 26, among others. The system 10 may adjust the velocity of the flow of water 24 in real-time by manual adjustment using the computer coupled to the system.

Figure 7:
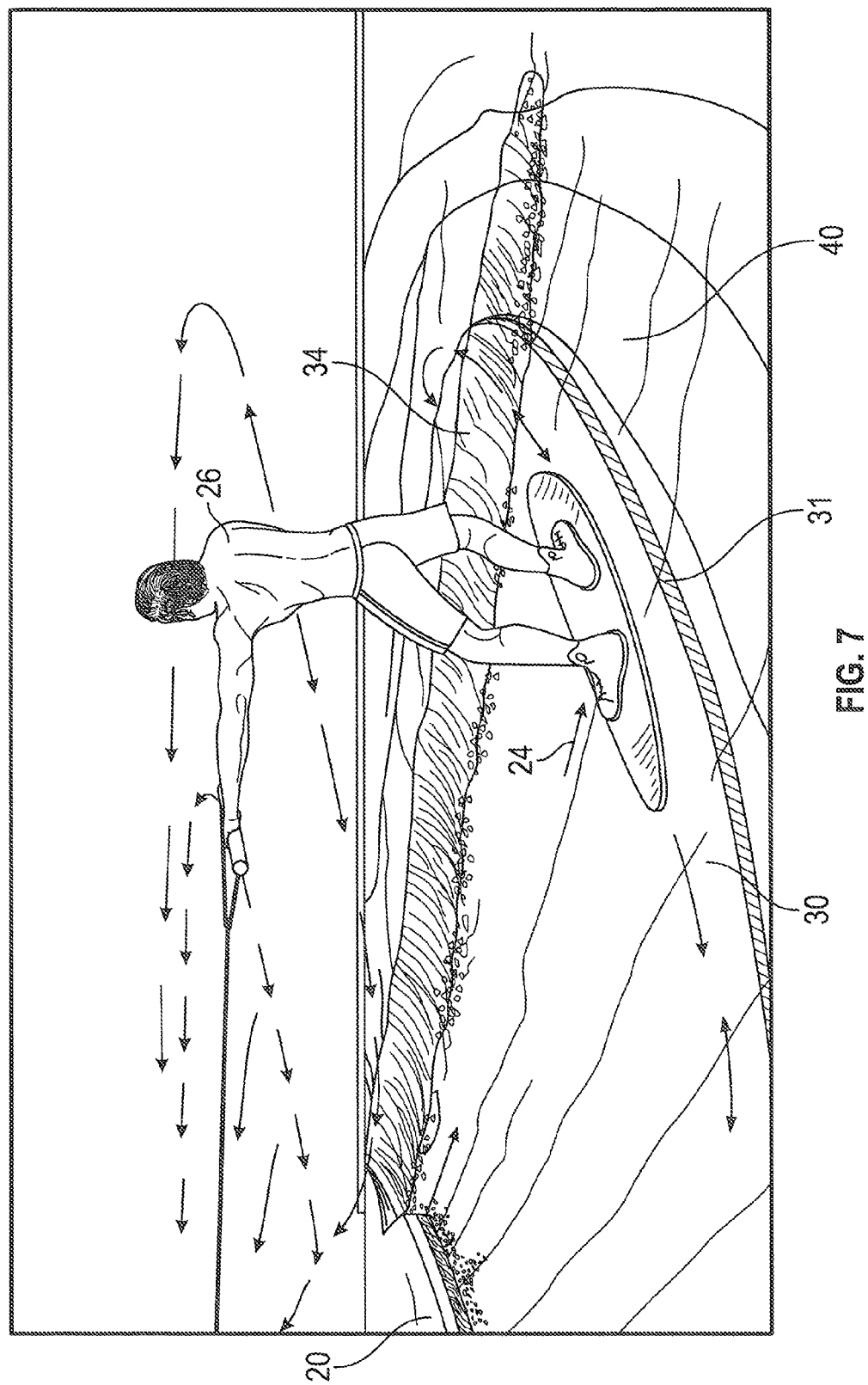
FIG. 7 depicts a perspective view of a user utilizing an exemplary embodiment of the wakeboarding system in accordance with the present disclosure.
Figure 8:
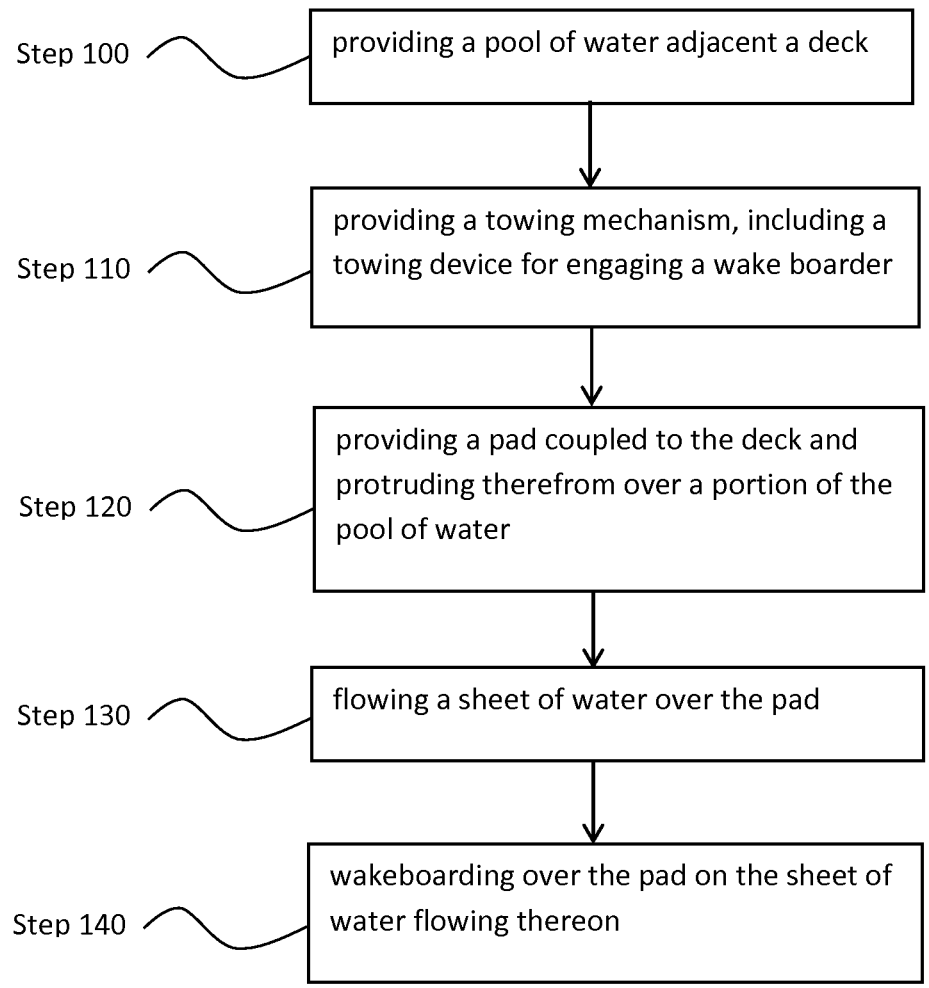
FIG. 8 depicts a schematic view of a method of using an exemplary embodiment of the wakeboarding system in accordance with the present disclosure.

Under the conditions described above, a wake boarder 26 that utilizes the system 10 may experience the activity of wakeboarding, as depicted in FIGS. 1 and 7. For example, the system 10 may further comprise a towing mechanism 29 that is positioned in the system 10 at a virtual center of the semi-circle shape of the pad 30. In this way, the wake boarder 26 may hold onto one end of a tow device 28, such as a tow rope or other towing connector, that is connected on its opposing end to the towing mechanism 29 and may wakeboard about the towing mechanism 29 along a perimeter section of the pad 30. The length of the tow device 28 may be slightly shorter than the radius of the pad 30, such that the wake boarder 26 wakeboards over the outer perimeter section of the pad 30 on the flow of water 24 flowing over the pad 30, as depicted in FIG. 7. As the wake boarder 26 traverses the outer perimeter of the pad 30 from one edge 33a of the semi-circular shape of the pad 30 to the opposing edge 33b of the semi-circular shape of the pad 30, the wake boarder 26 may engage the protrusions 34 on the surface of the pad 30 over which the flow of water 24 flows. In this way, the wake boarder 26 may move right or left over each protrusion 34 as if moving right or left over the wake of a motorboat on a standing body of water. The wake boarder 26 may further utilize the protrusions 34 and the flow of water 24 flowing over the sides 36 thereof to perform tricks, jumps, and other related skills, as if wakeboarding behind a motorboat on a standing body of water.

Embodiments of the system 10 further include the pad 30 being configured to conform, react, bend, displace, or otherwise move in response to the flow of water 24 and the wake boarder 26. As described above, the pad 30 is formed of foam or rubber materials and thus is bendable and flexible. Moreover, the pad 30 is buoyant. Because the pad 30 floats on the pool of water 40, the pad 30 is configured to displace, bend, react, or move to weight that is placed thereon, whether the weight be from the flow of water 24 over the top thereof or from the wake boarder 26 wakeboarding over the flow of water 24 on the top surface thereof. As weight is placed on the pad 30, the pad 30 simply sinks, even slightly, into the pool of water 40 according to the amount of weight placed thereon. Thus, the pad 30 moves and displaces in real-time to the weight and forces acting on the pad 30. Yet, even though the pad 30 may displace or move in reaction to the forces acting thereon, the buoyancy of the pad 30 restricts the pad 30 from sinking too far into the pool of water 40. If the pad 30 were to sink too far into the pool of water 40, the flow of water 24 would not have a surface on which to flow and the wake boarder 26 would sink into the pool of water 40. Thus, the configuration of the pad 30 floating on the pool of water 40 strikes the right balance between the necessary give and the necessary rigidity to provide a realistic wakeboarding experience. For example, as the wake boarder 26 traverses the pad 30 from one end 33a to the other end 33b, the portion of the pad 30 on which the wake boarder 26 is located at any one time may displace, even slightly, in response to the weight and movement of the wake boarder 26. This displacement of the pad 30, even slightly, into the pool of water 40 under the wake boarder 26 permits the flow of water 24 under the wake boarder 26 to remain between the wake boarder 26 and the pad 30 as the wake boarder 26 travels across the pad 30. If the pad 30 did not give way to the movement and force of the wake boarder 26, then the flow of water 24 under the wake boarder 26 would necessarily displace, because water is incompressible and cannot compact, and the wake boarder 26 may make more direct contact with the pad 30 than is desired to achieve a realistic wakeboarding experience.

Also, the pad 30 is configured on the pool of water 40 to be able to give way, displace, or otherwise move in response to an impact. At times, the wake boarder 26 may desire to do jumps and tricks over the protrusions 34. Upon landing a jump or trick, the wake boarder 26 must impact the flow of water 24. The pad 30 under the flow of water 24 is configured to displace, move, or sink into the pool of water 40 as much as is necessary to absorb the impact of the wake boarder 26. After displacing into the pool of water 40 due to impact, the buoyancy of the pad 30 causes the pad 30 to return to its original shape, ready for the next time the wake boarder 26 passes over the top thereof. In a similar manner, should the wake boarder 26 fall during a trick, the pad 30 is configured to displace, move, or sink into the pool of water 40 to absorb the uncontrolled impact of the wake boarder 26 so as to not cause harm or damage to the wake boarder 26. Once the wake boarder 26 falls or becomes disconnected from the tow device 28, the flow of water 24 pushes the wake boarder 26 off of the pad 30 and into the relatively slow-moving pool of water 40. The pool of water 40 effectively collects the fallen wake boarder 26 at any point beyond the edge 31 of the pad 30. The wake boarder 26 may thereafter swim to the bench 44 and exit the pool of water 40.

Embodiments of the system 10 further comprise the pump 50 reacting in real-time to predetermined conditions. For example, the system 10 may be configured to adjust the speed of the pump 50 when the wake boarder 26 becomes disconnected from the tow device 38. The towing mechanism 29 may have coupled thereto a pressure or force sensor that senses the tension in the tow device 28. Should the force sensor sense that the tension in the tow device 38 falls below a predetermined level for a predetermined time, then the system 10 may instruct the pump 50 to automatically slow down or even stop pumping. Thus, when a wake boarder 26 falls or decides to stop wake boarding 26, the wake boarder 26 simply releases his/her grip on the tow device 28 and thereby releases the tension in the tow device 28, which is sensed by the force sensor on the towing mechanism 29, which causes the pump 50 to react accordingly. Further, during jumps and tricks the tension in the tow device 28 may fall below predetermined tension levels, but tension in the tow device 28 will resume upon the landing of the jump and/or trick. Thus, the lack of tension in the tow device 28 must be for a predetermined length of time that is longer than is needed to perform jumps and tricks, so as to not instruct the pump 50 to stop pumping at incorrect times.

Embodiments of the system 10 further comprise the system 10 being programmed or configured to gradually increase the flow of water 24 from an initial speed to the predetermined speed between 12 and 25 miles per hour. By gradually increasing the speed, the wake boarder 26 may more easily compensate for the speed of the oncoming flow of water 24 and may adequately balance on the wakeboard until the speed of the flow of water 24 reaches an adequate speed to lift the wake boarder 26 onto the flow of water 24.

Figure 4A:
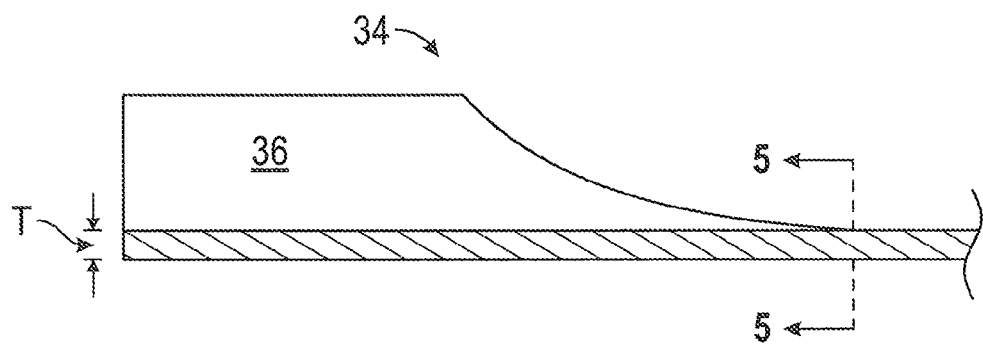
FIGS. 4A-4C depict a side view of exemplary embodiments of a component of the wakeboarding system in accordance with the present disclosure.
Figure 4B:
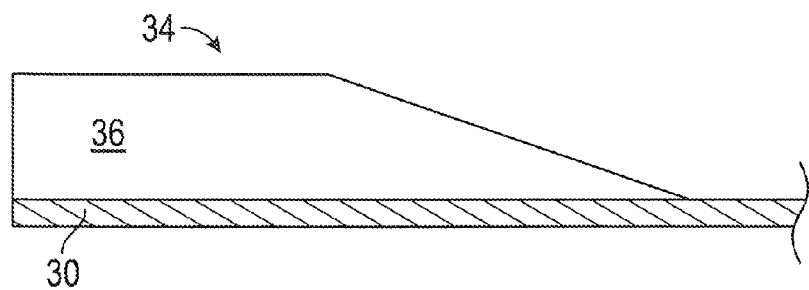
Figure 4C:
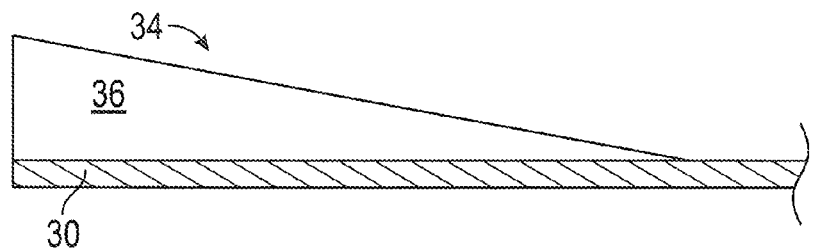
Figure 5A:
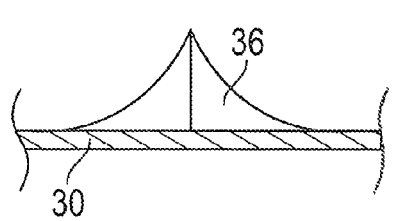
FIGS. 5A-5B depict a front view of the exemplary embodiments of the component taken along line 5-5 of FIG. 4A in accordance with the present disclosure.
Figure 5B:
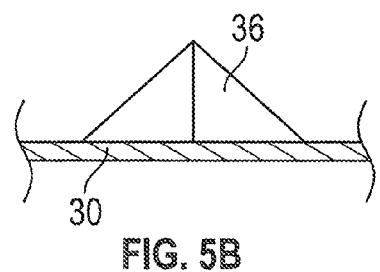
Figure 6A:
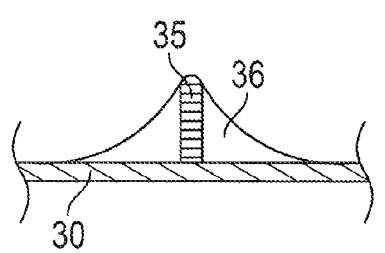
FIGS. 6A-6B depict a front view of exemplary embodiments of the component in FIGS. 5A and 5B in accordance with the present disclosure.
Figure 6B:
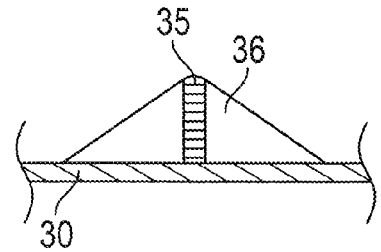

With reference to FIGS. 4A-6B, embodiments of the system 10 further include the protrusion 34 having a gradually increasing incline in an initial section followed by a level section, as depicted in FIG. 4A, the protrusion 34 having an initial straight, inclined section followed by a level section, as shown in FIG. 4B, or the protrusion 34 having its top surface being inclined from its initial point of contact with the pad 30 to its end, as depicted in FIG. 4C. Further, the protrusions have sides 36. As depicted in FIG. 5A, the sides 36 may have a gradually increasing incline from the bottom near the pad 30 to the top of the protrusion 34 where the sides 36 meet. As depicted in FIG. 5B, the sides 36 may have a straight incline from the bottom near the pad 30 to the top of the protrusion 34 where the sides 36 meet. As depicted in FIG. 6A, the sides 36 may have a gradually increasing incline from the bottom near the pad 30 to the top of the protrusion 34 where the sides 36 meet, but may further have a rounded top edge 35 that extends down the length of the protrusion 34 to the pad 30. As depicted in FIG. 6B, the sides 36 may have a straight incline from the bottom near the pad 30 to the top of the protrusion 34 where the sides 36 meet, but may further have a rounded top edge 35 that extends down the length of the protrusion 34 to the pad 30. With these configurations, the wake boarder 26 may request protrusions 34 that accommodate the style, trick, jump, or general skill that the wake boarder 26 wishes to perform. For example, a gradually increasing incline may provide greater loft to the wake boarder 26, whereas straight incline may provide a more consistent surface from which to elevate. Similarly, a rounded top edge 35 may allow a less-experienced wake boarder 26 to move gradually over the protrusions 34 with less severe elevation change.

The system 10 may further comprise a computer system, including, but not limited to, a processor (CPU), an internal storage unit, random access memory (RAM), software, alternative inputs for a keyboard or mouse or other input device, a USB drive, a multi card reader, a flash drive, a motherboard, a video card, a sound card, and a speaker. The computer system herein described is configured to control the operational aspects of the system 10. For example, the software may be a computer program that is developed and configured to operate the system 10 according to its intended operation, as described herein.

In addition to the disclosure provided above, a method of operating the system 10 is described. The method comprises, step 100, providing a pool of water adjacent a deck, step 110, providing a towing mechanism, including a towing device for engaging a wake boarder, step 120, providing a pad coupled to the deck and protruding therefrom over a portion of the pool of water, step 130, flowing a sheet of water over the pad, and, step 140, wakeboarding over the pad on the sheet of water flowing thereon. Further, the wake boarder 26 participates in the activity of wakeboarding by wakeboarding on the flow of water 24 over the pad 30 on an outer perimeter of the pad 30. The wake boarder 26 may wakeboard around the entire semi-circular perimeter of the pad 30 and thereby criss-cross over the protrusions 34 configured on the pad 30. Additional details of the methods related to the use of the system 10 are described above as they relate to the structure of the system 10.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the present disclosure, as required by the following claims. The claims provide the scope of the coverage of the present disclosure and should not be limited to the specific examples provided herein.

What is claimed is:

1. A apparatus for wakeboarding, the apparatus comprising:
   a deck;
   a pool of water adjacent the deck;
   a pad having a top surface and a bottom surface, the pad being fixedly coupled to the deck and protruding therefrom over a portion of the pool of water, the bottom surface of the pad being in contact with the pool of water and the pad being configured to float on the pool of water, wherein the pad further comprises an outer edge that opposes the deck, the outer edge being configured in a semi-circle;
   a flow of water over the top surface of the pad, wherein the flow of water enters the pool of water after flowing over the pads;
   a plurality of water propellant units and two wedge-like protrusions on the pad, a portion of the plurality of water propellant units positioned between the two wedge-like protrusions being configured to direct the flow of water parallel with the radius of the pad, and a portion of the plurality of water propellant units positioned outside the two protrusions being configured to direct the flow of water perpendicular to the deck.

2. The apparatus of claim 1, wherein the protrusion further having a length, the protrusion configured on the top surface of the pad and the length of the pad being oriented parallel to the radius of the pad.

3. The apparatus of claim 1, wherein the apparatus further comprises a towing mechanism, the towing mechanism having a tow device coupled thereto for towing a wake boarder, the towing mechanism being configured at a virtual center of the semi-circular pad.

4. The apparatus of claim 1, wherein the apparatus further comprises a water reservoir, a water pump, and piping, the water pump being configured to pump water from the water reservoir through the piping to at least one of the plurality of water propellant units, at least one of the plurality of water propellant units being configured to direct the flow of water over the top surface of the pad.

5. The apparatus of claim 4, wherein the water pump is configured to adjust the flow of water out of at least one of the plurality of water propellant units under the condition that certain predetermined conditions are satisfied.

6. A wakeboarding system, the system comprising:
   a deck;
   a pool of water adjacent the deck;
   a pad having a top surface and a bottom surface, the pad being fixedly coupled to the deck and protruding therefrom over a portion of the pool of water, wherein the pad further comprises an outer edge that opposes the deck, the outer edge being configured in a semi-circle, a plurality of protrusions oriented parallel with the radius of the pad, the plurality of protrusions being configured on the pad to simulate opposing sides of a motorboat wake;
   a flow of water over the top surface of the pad, wherein the pad separates the flow of water from the pool of water and the flow of water engages the pool of water after flowing over the pad;
   a plurality of water propellant units, a set of the plurality of water propellant units positioned between the protrusions creating the opposing sides of the motorboat wake being configured to direct the flow of water parallel with the radius of the pad, and a set of the plurality of water propellant units positioned outside the protrusions creating the opposing sides of the motorboat wake being configured to direct the flow of water perpendicular to the deck.

7. The system of claim 6, wherein the apparatus further comprises a towing mechanism, the towing mechanism having a tow device coupled thereto for towing a wake boarder, the towing mechanism being configured at a virtual center of the semi-circular pad.

8. The system of claim 7, wherein under the condition that the wake boarder engages the tow device, the towing mechanism and tow device cooperate to permit the wake boarder to traverse the semi-circle pad about a perimeter of the pad from one end of the semi-circle shape to an opposing end of the semi-circle shape.

9. The system of claim 8, wherein the apparatus further comprises a water reservoir, a water pump, and piping, the water pump being configured to pump water from the water reservoir through the piping to at least one of the plurality of water propellant units, at least one of the plurality of water propellant units being configured to direct the flow of water over the top surface of the pad.

* * * * *